United States Patent
Lodde et al.

(10) Patent No.: US 10,857,565 B2
(45) Date of Patent: Dec. 8, 2020

(54) SELF-WINDABLE, CROSS-TEARABLE, TEXTILE INDUSTRIAL ADHESIVE TAPE HAVING A KNITTED SUBSTRATE

(71) Applicant: Coroplast Fritz Müller GmbH & Co. KG, Wuppertal (DE)

(72) Inventors: Christoph Lodde, Holzwickede (DE); Gülay Wittig, Bochum (DE); Guido Vorwerk, Warendorf (DE)

(73) Assignee: Coroplast Fritz Müller GmbH & Co. KG, Wuppertal (DE)

(*) Notice: Subject to any disclaimer, the term of this patent is extended or adjusted under 35 U.S.C. 154(b) by 529 days.

(21) Appl. No.: 14/439,550

(22) PCT Filed: Oct. 29, 2013

(86) PCT No.: PCT/EP2013/072624
§ 371 (c)(1),
(2) Date: Apr. 29, 2015

(87) PCT Pub. No.: WO2014/067953
PCT Pub. Date: May 8, 2014

(65) Prior Publication Data
US 2015/0299522 A1    Oct. 22, 2015

(30) Foreign Application Priority Data
Oct. 30, 2012 (DE) .................. 20 2012 104 161 U

(51) Int. Cl.
*B05D 1/28* (2006.01)
*D04B 21/16* (2006.01)
(Continued)

(52) U.S. Cl.
CPC .................. *B05D 1/28* (2013.01); *B05D 1/02* (2013.01); *B05D 5/00* (2013.01); *C09J 7/21* (2018.01);
(Continued)

(58) Field of Classification Search
CPC ...................................................... D04B 21/16
(Continued)

(56) References Cited

U.S. PATENT DOCUMENTS 1,661,055 A    2/1928 Springthorpe
4,303,724 A * 12/1981 Sergeant ................. B32B 27/12
                                                        442/41
(Continued)

FOREIGN PATENT DOCUMENTS

DE    31 26 660 A1    7/1982
DE    69501633 T2     7/1998
(Continued)

OTHER PUBLICATIONS

JP 2011-026717A, English Translation, Feb. 10, 2011. (Year: 2011).*
(Continued)

*Primary Examiner* — Jenna L Johnson
(74) *Attorney, Agent, or Firm* — Dickinson Wright PLLC

(57) ABSTRACT

A self-windable, transversely tearable textile industrial adhesive tape (1) having a tape-shaped substrate (2) which has a thickness (D2) in the range of 0.05 mm to 1.8 mm, consisting of a knitted fabric (3) having stitches (5) made of yarn (4), and which is provided on one side with a pressure-sensitive adhesive coating (6) which is applied directly to the substrate (2) with a specific weight per unit area in the range of 20 g/m² to 300 g/m². In order to obtain improved manufacturability as well as improved functional characteristics, in particular an improved dimensional stability during the process, while preserving the advantages of using a substrate (2), it is proposed that the substrate (2) includes weft threads (7) running mutually parallel in the transverse direction, which weft threads (7) are held in the stitches (5) of the knitted fabric (3).

34 Claims, 6 Drawing Sheets

(51) Int. Cl.
*C09J 7/21* (2018.01)
*C09J 7/38* (2018.01)
*B05D 1/02* (2006.01)
*B05D 5/00* (2006.01)

(52) U.S. Cl.
CPC ............... *C09J 7/38* (2018.01); *D04B 21/16* (2013.01); *C08L 2201/50* (2013.01); *C09J 2203/302* (2013.01); *C09J 2400/263* (2013.01); *D10B 2403/0112* (2013.01); *D10B 2403/0311* (2013.01)

(58) Field of Classification Search
USPC .......................................................... 442/312
See application file for complete search history.

(56) References Cited

U.S. PATENT DOCUMENTS

| | | | | | |
|---|---|---|---|---|---|
| 5,017,425 | A | * | 5/1991 | Sanders | ................... B32B 27/12 428/343 |
| 7,181,933 | B2 | * | 2/2007 | Callaway | ................... B32B 3/26 66/193 |
| 2004/0152384 | A1 | * | 8/2004 | Ommerborn | ............. C09J 7/04 442/151 |
| 2005/0158539 | A1 | * | 7/2005 | Murphy | ................ A61F 13/023 428/343 |

FOREIGN PATENT DOCUMENTS

| | | | |
|---|---|---|---|
| DE | 198 54 153 C1 | 7/2000 | |
| DE | 299 00 924 U1 | 8/2000 | |
| DE | 101 02 927 A1 | 7/2002 | |
| DE | 20 2004 011400 U1 | 11/2005 | |
| DE | 10 2008 062 312 A1 | 6/2010 | |
| DE | 10 2009 022 163 A1 | 5/2011 | |
| EP | 0760841 A1 | 3/1997 | |
| EP | 1 433 885 A1 | 6/2004 | |
| EP | 2 000 516 A1 | 12/2008 | |
| GB | 2408515 A * | 6/2005 | ............. D04B 21/14 |
| JP | 2009-138031 A | 6/2009 | |
| JP | 2011026717 A * | 2/2011 | ............. D04B 21/16 |

OTHER PUBLICATIONS

Spencer, David J. Knitting Technology: A Comprehensive Handbook and Practical Guide. Wood Head Publishing Limited, Cambridge, England. 2001 pp. 334-335. (Year: 2001).*

Spencer, David J. Knitting Technology: A comprehensive handbook and practical guide 3rd Edition. Wood Head Publishing Limited, Cambridge, England. 2001. pp. 38-41. (Year: 2001).*

Humphries, Mary. Fabric Reference. Prentice Hall, New Jersey. 1996. pp. 92-93. (Year: 1996).*

Hearle, J. W. S., L. Hollick, and D K Wilson. Yarn Texturing Technology. Woodhead Publishing Limited, Cambridge, England. 2001. pp. 211-243. (Year: 2001).*

Tortoa, Phyllis G. and Robert S, Merkel. Fairchild's Dictionary of Textiles 7th Edition. Fairchild Publications, New York. 2003. pp. 8, 201, 287 (Year: 2003).*

PCT International Search Report—dated Jan. 21, 2014.

Spencer, David J., "Knitting Technology—A Comprehensive Handbook and Practical Guide," Third Edition, 2001, Wodhead Publishing Limited and Technomic Publishing Company Inc., 13 pages.

RS MSU S / RS MSU S-G, Warp Knitting Machines With Parallel Weft Insertion, Karl Mayer Products, 2010, 8 pages (best available copy provided).

* cited by examiner

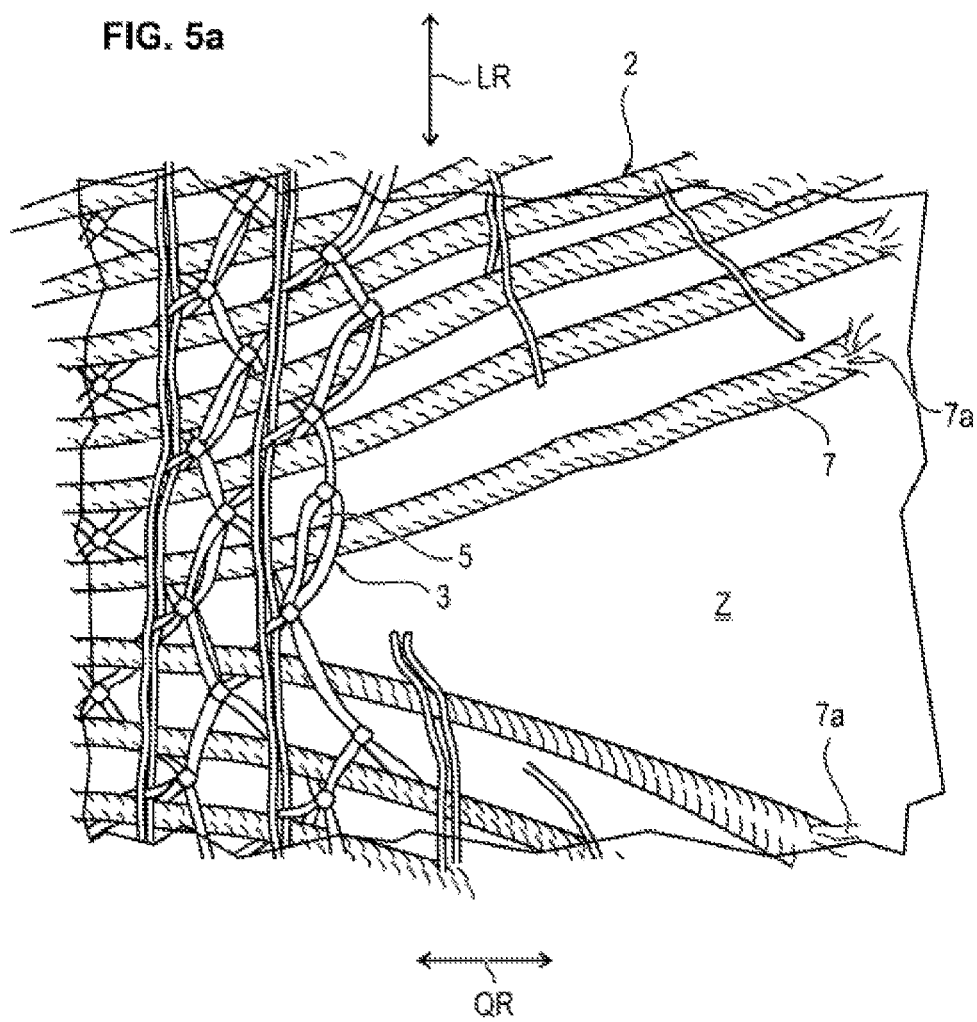

Fig. 6

TABLE 1

|  | Unit | Construction 1 | Construction 2 | Construction 3 |
|---|---|---|---|---|
| Substrate material | --- | Polyester knitted fabric with weft insertion | Polyester knitted fabric with weft insertion | Polyester knitted fabric with weft insertion |
| Weight per unit area | g/m² | 50 | 80 | 40 |
| Type of fiber | --- | 100% polyester | 100% polyester | 100% polyester |
| Wale count | 1/cm | 5 | 5 | 7 |
| Course count | 1/cm | 5 | 5 | 7 |
| Type of yarn (knitted fabric) | unit | Filament | Filament | Filament |
| Yarn density | dtex | 55 | 76 | 50 |
| Weft insertion | 1/cm | 10 | 15 | 21 |
| Density of weft yarn | dtex | 360 | 550 | 167 |
| Type of weft yarn | unit | Staple Fiber/Filament | Filament | Filament |
| Air permeability | l/m² | 3500 – 4000 | 1000 – 2000 | 3000 – 3500 |
| Tear strength (Elmendorf) | mN | 6000 – 7000 | 6000 – 8000 | 2000 – 4000 |
| Weft angle to warp direction | degrees | 90 | 90 | 90 |
| Lap | --- | Pillar stitch | Pillar stitch | Pillar stitch |
| Stitch type | --- | Open stitch | Closed stitch | Open stitch |

Fig. 7    TABLE 2

| | Unit | V1 | V2 | Construction 1 | Construction 2 | Construction 3 |
|---|---|---|---|---|---|---|
| Substrate material | - | PET stitch-bonded nonwoven | PET knitted fabrics | PET stitch-bonded fabrics w/ weft insertion | Polyester | Polyester |
| Substrate color | - | sw | sw | sw | sw | sw |
| Weight per unit area, substrate | g/m² | 60 | 90 | 50 | 80 | 40 |
| Adhesive | / | Synthetic rubber | Acrylate | Acrylate | Acrylate | Acrylate |
| Adhesive application | g/m² | 80 | 70 | 40 | 60 | 30 |
| Tape thickness | mm | 0.25 | 0.3 | 0.22 | 0.30 | 0.20 |
| Mechanical values | | | | | | |
| Elongation at break | % | 21 – 35 | 15 – 25 | 15 – 25 | 15 – 25 | 25 – 40 |
| Tear strength | n/cm | 25 – 35 | 40 – 45 | 25 – 35 | 35 – 45 | 40 – 100 |
| Adhesive force | | | | | | |
| Steel | N/cm | 5.5 – 6.5 | 3.5 – 4.5 | 7.5 – 9.5 | 8.5 – 9.9 | 7.0 – 9.0 |
| Back of tape | N/cm | 5.1 – 6.0 | 2.5 – 3.5 | 3.5 – 4.5 | 5.5 – 6.5 | 3.5 – 5.0 |
| Unwinding force | N | 2 – 6 | 3 – 7 | 3 – 7 | 3 – 7 | 3 – 7 |
| Flagging | | On pressure | On pressure | On pressure | On pressure | On pressure |
| 30 min/24 h | | All right | All right | All right | All right | All right |
| Noise dampening | class | C | A | B/C | B/C | B/C |
| Abrasion resistance 5-mm pin | strokes/class | A | A | A | A | A |

SELF-WINDABLE, CROSS-TEARABLE, TEXTILE INDUSTRIAL ADHESIVE TAPE HAVING A KNITTED SUBSTRATE

CROSS-REFERENCE TO RELATED APPLICATIONS

This application claims priority to German Patent Application No. 20 2012 104 161.8, filed on Oct. 30, 2012 and PCT/EP2013/072624, filed on Oct. 29, 2013.

FIELD OF THE INVENTION

The present invention relates to a self-windable, cross-tearable, textile industrial adhesive tape having a tape-shaped substrate which has a thickness in the range of 0.1 mm to 1.8 mm, consisting of a knitted fabric having stitches made of yarn, and which on one side is provided with a pressure-sensitive adhesive coating which is directly applied to the substrate with a specific weight per unit in the area of 20 g/m² to 300 g/m².

BACKGROUND

The German utility model DE 299 00 924 U1 describes a velour adhesive tape which is used for attachment to a complementary Velcro patch, in particular for wrapping elongated products, such as cable harnesses for automobiles, and comprises a tape-shaped textile substrate which has loops on the top side that can be used with Velcro and to whose underside a primer coating is applied, and a self-adhesive coating is applied to the primer coating. The primer coating has a specific weight per unit area—also called grammage—of less than about 20 g/m². The substrate can also consist of a warp knitted fabric. A range of about 0.8 mm to 2.00 mm is disclosed for the thickness of its material, and a range of about 120 g/m² to 220 g/m² for its specific surface weight. The known adhesive tape is a relatively strong material insofar as the substrate has a tensile strength of about 100 N/cm to 200 N/cm in the longitudinal direction.

An adhesive tape known from DE 101 02 927 A1 is an adhesive tape for wrapping, for example, cables in cars or pipes or the like, usually elongated objects. In its basic construction, the adhesive tape is also provided with a velour-based substrate tape and an adhesive coating applied at least in sections to the substrate tape. The adhesive tape may also be manufactured on the basis of a knitted fabric. As the substrate tape has a stitch density in the range of about 25,000 per dm² to 50,000 per dm², the adhesive coating can be applied directly to the substrate tape, that is, in contrast to the adhesive tape according to DE 299 00 924 U1, a primer coating is not provided. This known adhesive tape consists of a relatively strong material, as the substrate also has a tensile strength of about 100 N/cm to 200 N/cm in the longitudinal direction.

Adhesive tapes can be processed either manually or on winding machines. When processed manually, easy tearability is desired in some areas to avoid the risk of injury from knives or cutting tools that would be used. Hand-tearable adhesive tapes can be applied faster compared to tapes that cannot be torn by hand, so that the user can achieve higher productivity by using manually tearable adhesive tapes. The tapes described above are not hand-tearable due to their high strength.

The following substrates are now being used for hand-tearable textile adhesive tapes: rayon fabric, acrylate-coated rayon fabric, polyester fabric, polyester stitch-bonded non-woven fabric, hydro-entangled nonwoven fabrics, needle-punched nonwoven fabrics, inter alia. In particular, rayon fabric adhesive tapes have the disadvantage that, due to the rayon fabric, they are expensive and degradable. This also applies to acrylate coated rayon fabrics, where the acrylate coating of the substrate further increases the manufacturing costs.

The adhesive tapes made of polyester likewise have the disadvantage that they are expensive owing to the fabric used, where the price reflects the manufacturing costs of the tape including its substrate material. Depending on the type of yarn used, these tapes can be torn by hand or not. Adhesive tapes made of polyester, in particular of PET fabrics, are essentially also characterized by a high tensile strength. There are a few products with a dense and closed structure that can be torn by a hand. In the case of fabrics with an open and therefore permeable structure, this property complicates the application of the adhesive coating very greatly, in particular with UV-crosslinkable acrylate adhesives, because such adhesives are applied in a non-crosslinked manner and with high fluidity to the fabric.

When manufacturing PET fabrics, the process steps in general include; a) weaving, b) washing, c) thermosetting, and d) calendering.

PET stitch-bonded nonwoven fabrics have the disadvantage that they have a relatively low strength. When materials with higher strength are required, the weight per unit area must be increased, which has a negative effect on the tearability and the price. In addition, the thickness of the coating significantly increases as the weight per unit area increases, so that these tapes cannot be used everywhere. Substrates based on a spun-bonded nonwoven fabric usually cannot, or can only with difficulty, be torn by hand and still only have low strength. In addition, they taper sharply on tearing, which is not desired by the user.

A self-windable adhesive tape of the type mentioned above having a substrate consisting not of a fabric or non-woven fabric, but of a tape-shaped substrate made of a knitted fabric is known from EP 1 433 885 A1, with which adhesive tape hand-tearability can be achieved with a low manufacturing expenditure. In this known adhesive tape, the substrate material has a thickness of 0.1 mm to 1.0 mm and a specific weight per unit area in the range of 40 to 200 g/m², and is napless. The adhesive coating can be applied to the substrate without primer, wherein at least one smooth side of the substrate—the shiny side on visual inspection—is obtained by means of the knitted fabric, which ensures optimum adhesion of the adhesive to the substrate. In this connection, a napless configuration means that this known adhesive tape—from the point of view that textile fabrics are basically divided into flat or smooth fabrics, such as woven, non-woven, and smooth knitted fabrics, and into pile fabrics such as velour, velvet, plush, etc.—is not a so-called pile fabric, as it is defined in DIN 62055 as a textile fabric with pile-forming threads or fibers protruding on one or both sides from a substrate, but a flat fabric. The preferably knitted fabric of the substrate that is used is one such, which according to its type of weave has blocked stitches, wherein this type of lap can be designated as a combination of the basic laps of pillar stitch and velvet. The known adhesive tape has proven effective in practice; however it has been found that, especially with low substrate grammages, difficulties may disadvantageously arise in the manufacturing process when the tape is directly coated with adhesive, so that transfer coating must preferably be used. Furthermore, the tape may taper because the stitches of the knitted fabric shrink under tensile stress during the process. Irregular unwinding forces due to the strong elongation likewise occur when the adhesive knitted fabric tape is manufactured, which is considered an obstacle during the process. The noise dampening and abrasion resistance values of such a known tape are only minimal.

The underlying object of the invention is to provide an adhesive tape, in particular a hand-tearable adhesive tape of the type described above, which overcomes these disadvantages and has improved functional properties, in particular improved dimensional stability during the process, and which can be manufactured as a knitted fabric with low technological expenditure while preserving the advantages of using a substrate.

SUMMARY AND INTRODUCTORY DESCRIPTION

According to the present invention, this object is attained in that the substrate having transverse, mutually parallel weft threads, which are held in the stitches of the knitted fabric.

The adhesive tape according to the present invention can be manufactured with a much lower expenditure compared to fabric tapes because it has a substrate consisting of a knitted fabric and therefore various process steps required during the manufacture of fabrics like washing out spinning oil, thermosetting, and calendering to make the fabric more dense can be omitted during its manufacture.

The knitted fabric of the substrate used according to the present invention in this case can advantageously have characteristics known per se in knitted fabrics, where their advantages will improve synergistically when interacting with the weft threads incorporated in the transverse direction in the substrate. Consequently, the adhesive tape according to the present invention can be processed manually as well as mechanically, wherein its assembly times can be shortened in comparison with the known tapes that cannot be torn by hand mentioned at the beginning. The tape can be torn off transversely to its winding direction, where cleaner and more uniform straight cutting edges can be obtained along the weft threads in comparison with the known, likewise hand-tearable adhesive tape. Frayed and fibrous cutting edges as well as tapering of the material in the tearing process are virtually ruled out because the position of the stitches is stable owing to the weft threads kept therein.

In a preferred embodiment, the weft threads can be embedded in each row of stitches of the knitted fabric for this purpose. Preferentially, it is also possible that in particular one or more weft threads are pulled through each stitch of the knitted fabric. In this connection, in a sense the stitches replace the weft weave with warp threads as they exist in a fabric. In general, weft thread densities in the range of 5 to 100 threads per cm, in particular in the range of 10 threads to 20 threads per cm, are considered to be ideal within the scope of the invention. Depending on the use of the weft threads, either materials with a high abrasion protection or materials with good noise dampening properties can be created.

Furthermore, the substrate material consisting of a knitted fabric with parallel weft insertion according to the present invention, which preferably is a warp knitted fabric, is an excellent lightweight but nevertheless dense coating substrate for the adhesive coating. Permeation of the adhesive coating to the other side of the substrate can be completely prevented in this case—even when using a direct coating process and without a primer coating being available.

With regard to noise dampening and abrasion resistance, much higher values than the known characteristic values for nonwoven substrates can be achieved with an adhesive tape according to the present invention, at the same time with high air permeability, than with a conventional adhesive tape with a fabric substrate, wherein these values can to a large extent be varied by selecting the corresponding materials, gauges and yarn types for the weft threads.

In this way, monofilament or multifilament yarns can for example be used in particular as weft threads, and also staple fiber yarns—in particular to achieve high noise dampening—depending on the expected requirement or also with fewer wales and row densities of the knitted fabric of the adhesive tape according to the present invention. By using a filament yarn as weft yarn, a specific defined abrasion resistance of the knitted fabric can be achieved. Consequently, the knitted fabric acquires a fabric-like character. Owing to the staple fiber weft yarn, the knitted fabric acquires a nonwoven character with noise dampening properties.

The weft yarns can advantageously have a higher volume if they are textured and a higher stability if they are intermingled. Intermingling—also called interlacing—is an additional finishing of the threads, where the threads are selectively intermingled by means of air turbulence. In this case, the cohesion of the individual filaments is not achieved by twisting, but by entangling the filaments. Intermingling is possible with smooth threads, but intermingling is also possible directly after texturizing the threads.

It should be pointed out here that with the adhesive tape according to the present invention, weight per unit areas of less than 60 g/m² can advantageously be achieved, which is not possible with stitch-bonded or needle-punched nonwoven fabrics. In this case, the fabric structure is much more uniform than in the nonwoven fabrics mentioned above and free from disruptive thin areas, as can be seen in stitch-bonded nonwoven fabrics. The thickness of the adhesive tape according to the present invention in this case can in particular be in the range of 0.05 mm to 2.5 mm.

Despite the transverse hand tearability, a tensile strength of at least 15 N/cm, preferentially in the range of 15 N/cm to 120 N/cm, especially preferably in the range of 20 N/cm to 55 N/cm can be achieved in the longitudinal direction by means of the adhesive tape according to the present invention. In this case, the elongation at break in the longitudinal direction is not greater than 60% and preferentially in the range of 10% to 50%, in particular preferably in the range of 15% to 25%. If the adhesive tape according to the present invention has an elongation at break of less than 55%, it does not taper under tensile force.

The knitted fabrics used, in particular warp knitted fabrics, should preferentially not have an elastic behavior, wherein elasticity is understood as the ability of a material to reverse a shape change caused by a force (bending, pressure, traction, etc.) after the force is removed. Specifically for the invention, this in particular means that an adhesive tape recovers its original shape if it is relieved by less than 50%, preferentially by less than 25%, especially preferably by less than 10% of the elongation reached under stress before reaching the elongation at break. Preferentially, yarns or threads made of an elastomeric or elastic rubber material should therefore not be used within the scope of the invention.

In this way, the adhesive tape according to the present invention, in particular with respect to its properties, can be considered as an hybrid tape, which with regard to its use unifies the positive characteristics of fabric tapes and nonwoven fabric tapes in a synergistic manner, but at the same time by far surpasses the corresponding properties of known adhesive tapes with a knitted substrate.

The manufacture of textile fabrics consisting of a knitted substrate, whose stitches are threaded with mutually parallel weft threads, is a long established method in textile engineering, but one whose further technological development not been completed until recently. Textiles manufactured in this way are in particular used for upholstery fabrics such as seat covers, wherein preferentially elastic weft threads are used. For this purpose, with respect to the origins of the development of knitting machines, which are suitable for manufacturing substrates according to the present invention, reference is made by way of example to U.S. Pat. No. 1,661,055 (Springthorpe) and as regards newer technical approaches, to German patents DE 198 54 153 C1 (Karl Mayer Textilmaschinenfabrik GmbH) and DE 10 2009 022 163 B4 (Liba Maschinenfabrik GmbH), wherein the latter provide evidence of a high potential efficiency of the manufacturing process and thus a cost-effective method of manufacturing a substrate according to the present invention. Such textile fabrics are put to novel use by the invention.

The technical development of knitted fabrics has recently been oriented toward the manufacture of knitted fabrics with an ever higher stitch density, when its measure serves to indicate the gauge. Here the "English gauge" in particular is used, which in a numbering system used in warp knitting and knitting machines, indicates the number of warp or knitting needles included in an English inch (25.4 mm), and thus indicates the density of the warp or knitted fabric, this specification of the gauge having been standardized in DIN ISO 8188:2009-02 Textile Machinery and Accessories—Pitching of knitting machines" Today, gauges of up to E 60 and more are possible with modern highly precise knitting machines, wherein the corresponding fabrics have an extremely fine, silk-like character. Within the scope of the invention, however, such high gauges are not necessary or not desirable because the knitted fabric in fact contains additional threads passing through the stitches. According to the present invention, gauges from E9, in particular E18, E22, E24, E28, and E32 and to E44 are therefore considered to be ideal. The knitted fabric of the substrate can advantageously have a stitch course in the range of 2 per cm to 20 per cm, preferentially in the range of about 4 per cm to 18 per cm and a number of wales likewise in the range of about 3 per cm to 15 per cm, wherein the number of wales and stitch courses are defined according to DIN EN 14971.

In order to manufacture a substrate material that can be used according to the present invention with these gauges, a system consisting for example of bars and knitting elements is suitable, which has at least an individual needle bar and a tongue bar, a stitch sinker bar, a knock-over sinker bar with a knock-over sheet, one or two ground guide bars, one filler thread bar, which is configured as a guide or sinker and a weft insertion sinker bar. Alternatively, a system can also advantageously be used which consists of at least one individual needle bar and a slide bar, a compound sinker bar, one, two or three ground guide bars and the weft feeder bar. Filler threads may but need not be configured in the knitted fabric.

With the systems mentioned above, in particular stitch bonding fabrics can be manufactured according to the so-called Malimo® technique, which stitch bonding fabrics are deemed to be especially suitability as substrate material within the scope of the invention. Knitted fabrics with open or closed structures can be manufactured. For purposes of high mechanical stability—in contrast to twill fabrics or knitted fabrics with knitted stitches—the fabric can be made of a single-thread, double-thread, or multi-thread system. Therefore damage to the substrate fabric of the adhesive tape according to the present invention, in contrast to single-tread systems, does not always immediately result in excessive destruction of the fabric, that is, in so-called runs.

The substrate—as well as the yarn for the stitches of the knitted fabric, and also the weft threads—of the adhesive tape according to the present invention can consist of polyester yarn, preferentially of polyethylene terephthalate (PET), other synthetic fiber yarns, such as polyamide (PA), polyacrylate (PAC), polyacrylonitrile (PAN), polyethylene (PE) or polypropylene (PP) or of mixed synthetic fibers, preferentially PET/PA. Furthermore, cotton and rayon yarns can in particular be used for the weft threads. A temperature stability of the tape according to the present invention in the range of 125° C. to 150° C. can advantageously be achieved with these materials, wherein in this case the thermal stability according to the joint quality control guidelines LV 312 of Audi, BMW, Daimler, Porsche and VW "Protective systems for ready-to-install cable sets in motor vehicles" (LV 312-1, version 1/2009) corresponds to class A, B, or C. The substrate can be made rot-proof and with high flexibility and pliancy. In this connection, the specific weight per unit area of the substrate can be in the range of 20 to 250 g/m$^2$, preferably in the range of 40 to 120 g/m$^2$, wherein the thickness of the substrate material can in the range of about 0.2 mm to 1.5 mm can be viewed as preferable.

In the fabric used according to the present invention the three basic weave types right-left, left-left, and right-right are in principle used as well as the combination of all sorts of laps—that is, in particular open and closed pillar stitch, tricot, cloth, satin, velvet, atlas or twill as basic lap types, as well as further laps derived therefrom, wherein chain stitch and satin are preferred. Depending on the basic weave types, a smooth or ribbed substrate side can be configured in order to achieve the desired adhesive strength; this, however, is not necessary according to the present invention due to the presence of the weft threads. Even without such an embodiment, the adhesive will not permeate from one side of the material to the other when the tape is self-wound. The elasticity of the substrate in this case can be influenced by the lap type, in particular, for example, minimized for applications in the automotive industry. It is thus known, for example, that highest elasticity can be achieved with a tricot construction in the direction of the wales. In contrast, according to the present invention, a pillar stitch or satin construction for example is preferably used.

In the pillar stitch construction, which is preferred according to the present invention, the stitches are always made in the warp direction when warp knitting. In this way, the pillar stitch, in particular, provides the warp knitted fabric with longitudinal stability. The weft threads are each lapped over the same needle by the guide bar, so that only wales appear which are not connected to one another and thus do not form a cohesive surface. The pillar stitch is therefore always knitted in combination with other laps such as in particular—as already mentioned—satin. It can be knitted with open or closed stitches as an open pillar stitch or closed pillar stitch. The preferred open pillar stitch according to the present invention has the characteristic that it can be formed without a displacement of the underlap of the guide bar. In this connection, it is an advantage that this lap type causes less transverse tearability owing to its longitudinal stability in comparison with other lap types. The closed pillar stitch is preferred in products with higher abrasion resistance. In the case of the pillar stitch, the additional weft thread is always arranged transversely to the direction of the weft thread or of the stitches, preferentially at a 90° angle. During the processing of an adhesive tape according to the present invention, the weft thread or the space between two weft threads acts as a tear starting point, from where the stitches can then also easily be torn, exerting less force compared to a fabric without weft threads.

The linear densities of the yarn threads of the knitted fabric of the substrate can be in the range of about 20 dtex to 167 dtex, in particular preferably in the range of 30 dtex to 100 dtex, especially preferably in the range of 40 dtex to 80 dtex. In this case, using threads with a linear density of less than 84 dtex is in particular preferred.

The weft threads pulled through should instead preferably have a higher linear density than the threads of the knitted fabric. The linear density of the weft threads can advantageously be in the range of 76 dtex to 800 dtex, preferentially in the range of 110 dtex to 600 dtex, in particular preferably in the range of 350 dtex to 480 dtex. It goes without saying that for ideally interlacing the weft threads in the stitches, larger thread linear densities should be allocated in the weft to fabrics with lower linear densities, that is, for example E18, or also with less wales and row densities of the knitted fabric and vice versa.

Acrylate-based adhesives, in particular UV-crosslinkable acrylate-based adhesives, synthetic and natural rubber adhesives can be used as pressure-sensitive adhesives, wherein the coating method applied is determined according to the permeability of the substrate material. In any case, a continuous, uniform film is preferably applied to the substrate. With the adhesive tape according to the present invention, it is possible to achieve adhesive forces which conform well to the requirements of the specific application, as will be outlined quantitatively in detail below. The use of a pressure-sensitive silicone rubber adhesive is also possible.

In the case of nozzle application methods, there are three basic variants: direct coating, contact coating ("kiss coat"), and indirect coating, wherein the last can be carried out in particular without pressure, with the so-called curtain-coating method.

Direct coating in the first instance can be used as an application method. The known direct coating methods include roller coating and nozzle coating, wherein, in particular, the second form seems to be especially suited. In the case of roller coating, the fluid adhesive is applied in a dosed manner and with the desired layer thickness via a heated roller system. In the case of nozzle application, the adhesive is pressed through a wide slot nozzle (a so-called GID nozzle) by means of a pump, in particular a gear type pump, which wide slot nozzle can rest upon the substrate material in the process. The adhesive is directly applied uniformly over the surface of the substrate material by means of the nozzle.

Direct coating is always advantageously possible if the substrate is sufficiently dense, that is, if migration of the adhesive through the substrate can be precluded during the coating process. The substrate must also have a sufficient thermal stability. All of these conditions can be met by the adhesive tape according to the present invention.

As an alternative to the direct application method, a contact method ("kiss coat") can advantageously also be used by means of a Nordson nozzle, for example, which is known by the name of Truecoat nozzle. Bu using this method, it is possible that the adhesive can come into comparatively closer contact with the substrate, by means of which the warp and weft threads are additionally reinforced.

The adhesive—as mentioned above—can also be applied with a pressure-less coating method, such as the so-called "curtain-coating method". According to this method, a closed adhesive film falls on the substrate. As a result of this, a uniform thickness and thus grammage of the adhesive coating is obtained.

Finally, indirect coating methods such as, for example, transfer coating by means of an intermediate substrate, can be used. For this purpose, a siliconized interliner, for example siliconized paper or siliconized polymer film, such as polyolefin film or polyester film, is first coated. Subsequently the substrate material is laminated. If a self-winding adhesive tape is to be manufactured according to this method, the interliner, which is used as a processing aid, must be pulled off the substrate material and wound separately during the finishing of the rolls, however.

Pressure-less and transfer coating methods are preferably used on temperature-sensitive and/or substrates through which the adhesive can permeate. Damage to the substrate and soiling of the coating rollers are thus prevented during the coating process.

The adhesive coating can advantageously be applied with a grammage in the range of 20 $g/m^2$ to 300 $g/m^2$, preferentially in the range of 40 $g/m^2$ to 120 $g/m^2$.

BRIEF DESCRIPTION OF THE DRAWINGS

Further advantageous embodiments of the invention are contained in the subclaims as well as in the special description below. The invention will be explained in more detail with reference to several exemplary embodiments.

The invention will be exemplified in more detail by means of the drawing, which shows.

CONTINUED DESCRIPTION OF THE INVENTION

Figure 1:
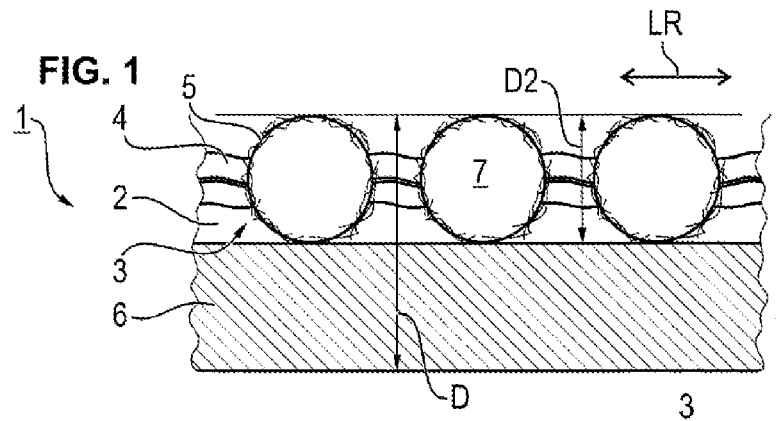
FIG. 1 a schematic cross-section of an adhesive tape according to the present invention, FIG. 2 a schematic top view of a first embodiment of a substrate of an adhesive tape according to the present invention, FIG. 3 a schematic top view of a second embodiment of a substrate of an adhesive tape according to the present invention, FIG. 4 a schematic top view of a third embodiment of a substrate of an adhesive tape according to the present invention, FIG. 5 an enlarged top view of the border of the third embodiment of the substrate of an adhesive tape according to the present invention FIG. 5a a view of the substrate of the adhesive tape according to the present invention, similar to that in FIG. 5, but at the beginning of a transverse tear, FIG. 6 an overview in the form of a table (Table 1) of the characteristics of a substrate of an adhesive tape according to the present invention and three different constructions, FIG. 7 an overview in the form of a table (Table 2) of the characteristics of an adhesive tape according to the present invention with the constructions according to FIG. 6 compared with those of two known adhesive tapes, FIG. 8 a schematic top view of a fourth embodiment of a substrate of an adhesive tape according to the present invention.

With respect to the description below, it is expressly pointed out that the invention has not been restricted to the exemplary embodiments and also not restricted to all or several combinations of characteristics, but each individual partial characteristic of each exemplary embodiment, in particular in relation to the lines in both tables, can also be fundamental to the present invention independently of all other partial characteristics described in connection therewith, for example, other lines of the tables as such and also combined with any characteristics of another exemplary embodiment.

The same parts will always be designated with same reference numerals in the figures of the drawing, so that they have each only been described once.

FIG. 1 shows a self-windable, transversely hand-tearable, textile industrial adhesive tape 1 which has a thickness D and a tape-shaped substrate 2. The substrate 2 preferably has a thickness D2 in the range of 0.05 mm to 1.00 mm and consists of a knitted fabric 3 with stitches made of yarn 4. The substrate 2 is provided with a pressure-sensitive adhesive coating 6, which is directly applied with a specific weight per unit area in the range of 20 g/m$^2$ to 350 g/m$^2$ and consists of a natural or synthetic rubber and/or acrylate and/or silicone containing preferentially crosslinkable adhesive.

According to the present invention, it is provided that the substrate 2 includes mutually parallel weft threads 7 in the transverse direction QR of the adhesive tape 1 according to the present invention, which weft threads 7 are held in the stitches 5 of the knitted fabric 3. The weft threads 7 in particular run at right angles to the longitudinal direction LR of the adhesive tape.

Figure 2:
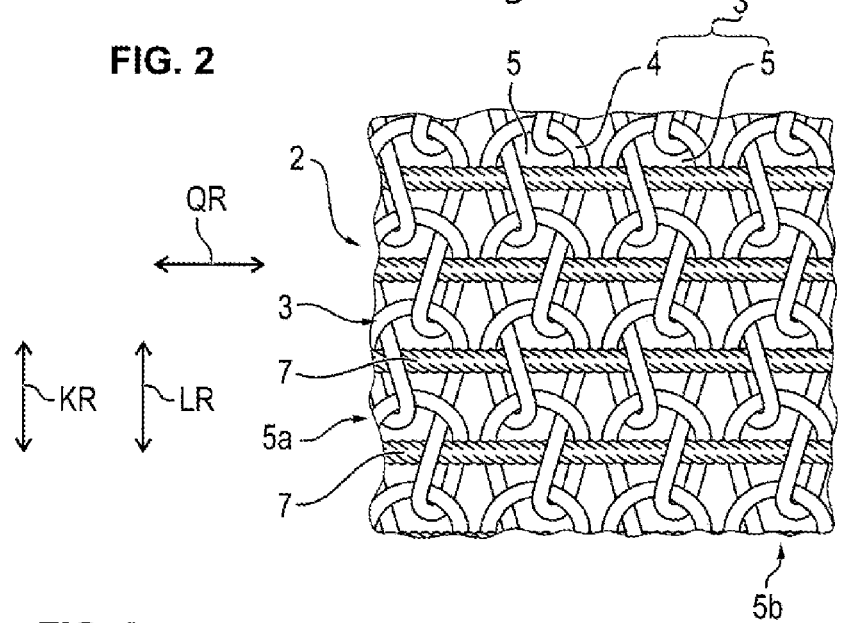

The first embodiment of a substrate 2 of an adhesive tape 1 according to the present invention shown in FIG. 2 shows a very simple embodiment. In this case, the knitted fabric 3 is available as open pillar stitch lapping, and a weft thread 7 is pulled through each course. In the warp knitted fabric, the weft threads 7 are at right angles to the warp direction KR or to the basic direction of the length of the wales, which in this embodiment is identical to the longitudinal direction LR of the adhesive tape 1. The latter is also the case in the embodiments of the substrate 2 shown in FIGS. 3 and 8.

Figure 3:
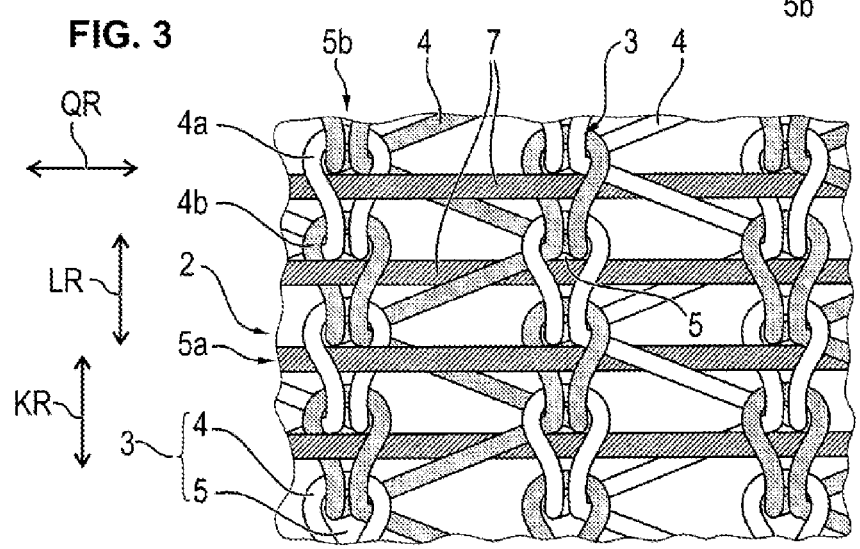

In the second embodiment of the substrate 2 shown in FIG. 3, the knitted fabric 3 is a tricot lap. A weft thread 7 is pulled through each course here as well. Owing to the different marking (black and white) of the threads 4 of the knitted fabric 3, it is clear that it is a system with two threads (4a—first yarn thread, 4b—second yarn thread) in a warp knitted fabric. The weft threads 7 are crosshatched in the drawing.

Figure 4:
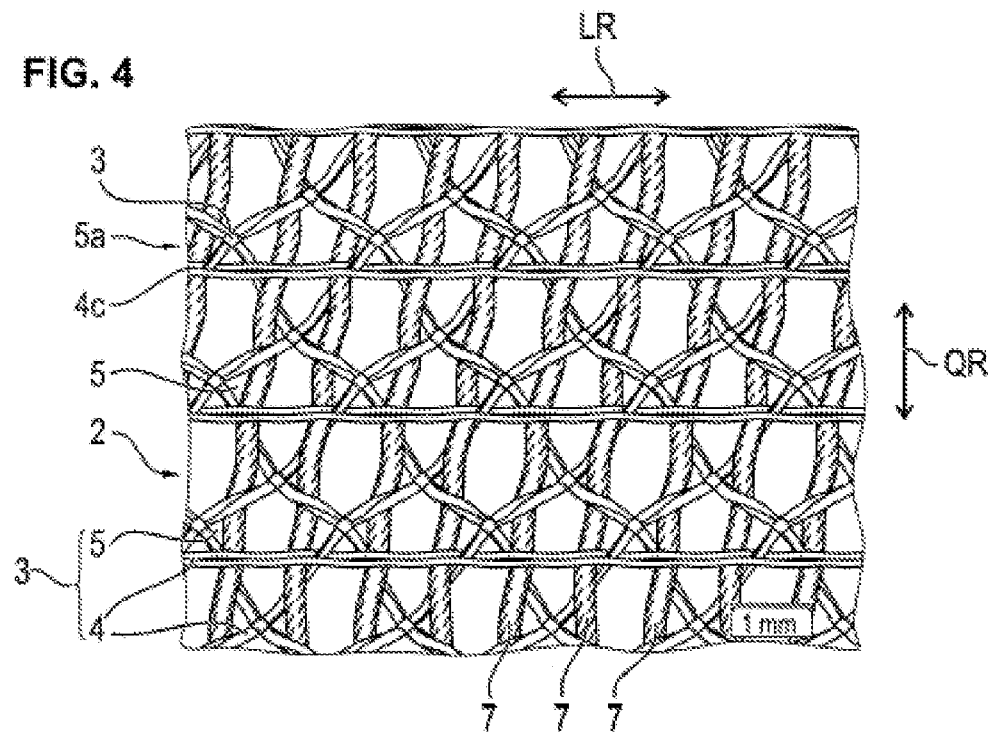
Figure 5:
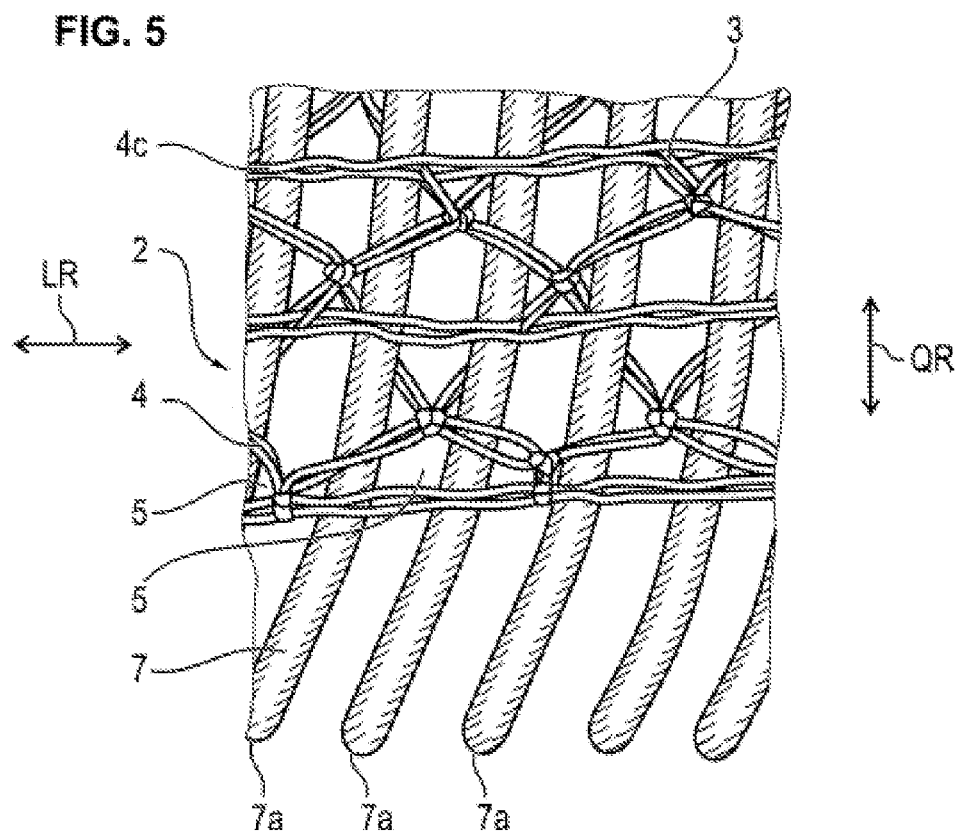

FIGS. 4 to 7 refer to three different constructions of an adhesive tape according to the present invention 1, in which the knitted fabric 3 of the substrate 2 likewise is a warp knitted fabric and at the same time a stitch-bonded fabric— that is, a so-called warp stitch fabric. The basic overlap type is a pillar stitch. FIGS. 4, 5 and 5a should in particular be allocated—with respect to the parameters of the knitted fabric 3 and of the weft threads 7—to the "construction 1" of FIGS. 6 and 7 outlined in the Tables 1 and 2.

It is apparent from the top views of the embodiment of the substrate 2 of the adhesive tape 1 according to the present invention shown in FIGS. 4, 5 and 5a that the knit fabric 3 of the substrate 2 can preferably be a warp stitch fabric. A characteristic of the shown knitted fabric 3 is not only that the weft threads 7 are embedded in each course 5a of the knitted fabric 3, but also that two weft threads 7 are pulled through each stitch 5 of the knitted fabric 3. In this connection, however, two adjacent weft threads 7, which are both located in a stitch 5 in one course 5a, are not in a stitch 5 in the consecutive course 5a but together in a stitch 5 with the respective weft thread 7 located next to the weft thread 7 on the other side. As a result, a very stable fabric-like structure is obtained. This is also the purpose of the optional weft threads 4a running in the longitudinal direction LR, that is, along the course 5a, by means of which weft threads 4a the stitches 5 can become closed stitches. The course of wales in the stitches 5 is designated with the reference numeral 5b.

Closed stitches 5 are understood to be stitches 5 whose feet intersect. Warp knitted fabrics are produced with closed and open stitches 5, knitwear and twill fabrics are produced with open stitches only. Closed stitches occur in warp knitted fabrics when the guide bar swings off after the overlap and carries out an overlap in the opposite direction.

As FIGS. 5 and 5a show, the weft threads 7 are cut off on the borders of the substrate 2. The free ends 7a formed in that way facilitate the transverse tearability of the adhesive tape 1 according to the present invention, as is in particular exemplified in FIG. 5a. The weft threads 7 or the space Z between two adjacent weft threads 2 each form a point at which the tear can be started, and from where the stitches 5 can also be easily torn and—compared with a knitted fabric 3 without weft threads 7—with less effort because the spread-out ends 7a of the adjacent weft threads 7 in this case act as a wedge on the substrate 2, in particular on its stitches 5. This is the case during the entire tearing process, in which one stitch 5 after the other is successively torn in the transverse direction QR.

The constructions of the substrate 2 of the adhesive tape 1 according to the present invention have the properties listed in Table 1 (FIG. 6). As is apparent from a comparison of the corresponding columns of the table, the constructions in particular differ in the fiber strength of the yarn 4 of the knitted fabric 2 (indicated as "sewing thread" in Table 1), the weft thread strength ("weft insertion"), the type and strength of the fibers of the weft threads 7, as well as in the air permeability and transverse tearability ("Elmendorf tear strength") of the substrate 2. Open stitches 5 were used in the construction 1 and 3, and closed stitches 5 were used in the construction 2.

Both substrate constructions were converted to adhesive tapes 1 according to the present invention in the usual manner by coating them with an acrylate-based adhesive coating. The adhesive tapes 1 produced according to the present invention have the properties listed in Table 2 (FIG. 7). These properties are compared with those of a known, non-inventive adhesive tape with a stitch-bonded fabric substrate (PET stitch-bonded nonwoven fabric), which is known as Coroplast® 8551 and designated with V1. Another comparable adhesive tape V2 known as Coroplast® 847 X with a substrate consisting of a PET knitted fabric is listed in Table 2.

The parameters indicated as basic data of the substrates and of the adhesive tapes were determined according to the following standards: EN ISO 2286-1 for the specific weight of the substrate 1, wale and wale course density according to DIN EN 14971, fiber strength (gauge) according to DIN 53830-3, thread density according to DIN EN 1049-2, DIN EN 1942 for the thickness D of the substrates, DIN EN 14410 for the mechanical values, DIN EN 1939 for the adhesive force, DIN EN 1944 for the unwinding force of the adhesive tapes, DIN 53 887 for the air permeability of the substrate, DIN EN 21974 for the tear strength. The flagging behavior, the noise dampening, and the abrasion resistance were determined according to LV 312.

Table 1 (FIG. 6) in particular highlights the air permeabilities of the substrate 2, which, at a test pressure of 100 Pa was in an overall range of 50 l/m$^2$s to 6000 l/m$^2$s or in the preferred range of 100 l/m²s to 4000 l/m²s. In this case, the Elmendorf tear strength was from 6 N to 8 N, these values being characteristic for tearability by hand. In general, an adhesive tape 1 according to the present invention can have a tear strength in the range of 2000 mN to 30000 mN in an Elmendorf test, wherein in particular it can be in the range of 2000 mN to 10000 mN, preferentially in the range of 3000 mN to 8000 mN in order to achieve hand-tearability. The construction 3 shows a lower range limit of only 2000 mN for this parameter.

In this connection, the acronyms in Table 2 (FIG. 7) mean: "s/w"—partly white, partly black substrate, "i. O."—all right, that is, no flagging after 30 minutes and 24 hours. The parameters indicated in Table 2 document the advantageous properties that can be obtained according to the present invention, in particular the comparable high abrasion values (Class 2 on the 5-mm pin in construction 2) and noise dampening (Class B or C in both constructions) with a low tear strength and tape thickness D as well as with a high adhesive force. The adhesive strength of the adhesive tape 1 according to the present invention can in particular be in the range of 2.0 N/cm to 15 N/cm, preferably in the range of 4.0 N/cm to 10 N/cm on steel and in the range of 2.0 N/cm to 15.0 N/cm, preferably in the range of 3.0 N/cm to 8.0 N/cm on the back of the tape.

The invention is not restricted to the shown and described exemplary embodiments, but also comprises all embodiments consistent with the invention. Thus as already mentioned, the substrate material 1 can also be a knitted fabric 3 with other types of lap than that shown. In this connection, it is not strictly necessary that the weft threads 7 are at exactly right angles to the warp direction KR or to the basic direction of the of the length of the wales and that the longitudinal direction LR of the adhesive tape 1 is identical to the warp direction KR. Thus cloth, satin and velvet weaves, for example, have a basic direction KR of the length of their wales, which can be inclined at an acute angle to the right or left side relative to the warp direction KR of the pillar stitch weave shown in FIG. 2 (FIG. 7), and thus to the longitudinal direction of the adhesive tape 1. Therefore the weft threads 7 are not exactly at right angles to this warp direction KR in the knitted fabric 3, but still transverse thereto, and should in any case always and preferably—as shown in FIG. 2—run transversely to the longitudinal direction LR of the adhesive tape 1 because their orientation essentially determines the course of the tear when tearing in the transverse direction. The resulting tear then likewise is at right angles to the longitudinal direction LR of the adhesive tape 1.

The person skilled in the art can also expand the invention by means of additional advantageous measures without abandoning the scope of the invention. The adhesive tape 1 according to the present invention can thus for example be optionally provided with a flame-resistant finishing. That the adhesive tape according to the present invention is a self-windable adhesive tape implies that it can be self-wound—that is, wound on its own back—and again unwound therefrom without the need for a siliconized interliner, which is reflected by the corresponding preferred adhesive forces in the range of 3.0 N/cm to 8.0 N/cm. The use of an interliner, however, is not beyond the scope of the invention, if, for example, these adhesive forces are required to be higher for certain applications.

Figure 8:
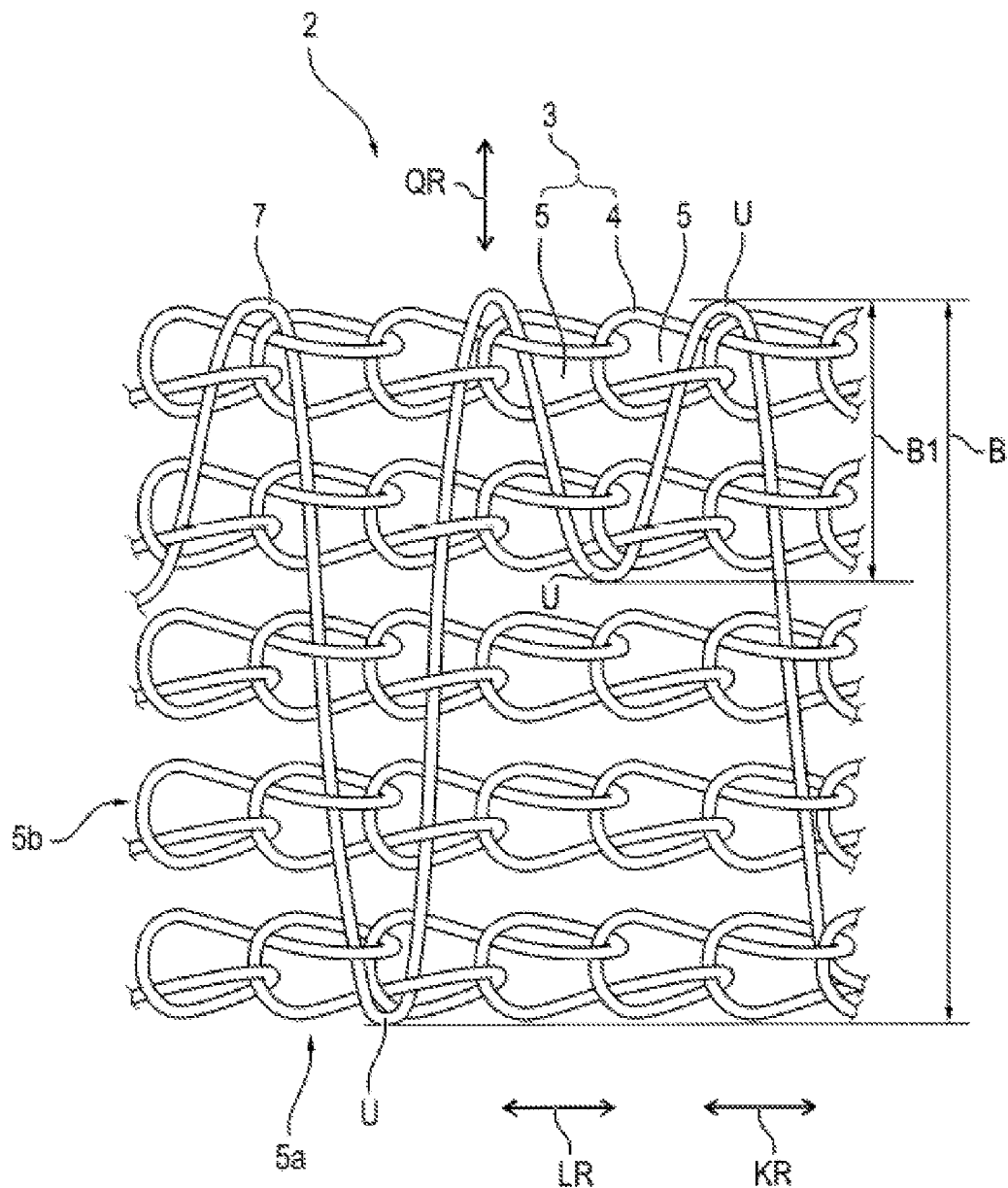

Furthermore, it should still be pointed out with reference to FIG. 8, which shows a fourth embodiment of a substrate 2, that on warp knitting, the weft thread 7 is interlaced between the needle loop and the sinker loop 5 of the fabric ground. Here the weft thread 7—as shown in FIGS. 2 to 5, and in part in FIG. 8—can either run across the entire width B of the substrate 2 of the adhesive tape 1 when it is called full weft and/or the weft thread 2—as is especially shown in FIG. 8—runs across only one part B1 of this width B, when it is called partial weft.

The weft thread 7 can run horizontally, diagonally or—only in case of partial wefts—vertically in the warp knitted fabric 3. Conventional guide bars which exclusively insert their warp threads in an underlap position into the substrate 2 are used to produce partial wefts. In the case of underlaps of different lengths and direction changes, inversion points U of the partial wefts result within the width B of the substrate 2.

Full wefts can be inserted into a warp knitted fabric 3 as a parallel weft (parallel to the courses 5a), as a diagonal weft (diagonal to the courses 5a) or as a cross weft (diagonal to the courses 5a with direction changes). They are produced by means of so-called magazine weft insertion devices. Full wefts are produced according to the course or not according to the course. Monoaxial, biaxial and multiaxial knitted fabrics 3 can be produced by means of full wefts. Full wefts can provide the substrate 2 with dimensional stability or elasticity along their axis, depending on the yarn 4 used.

In an adhesive tape 1 according to the present invention, the weft threads 1 can extend in the knitted fabric 3 of the substrate 2 at least in sections as partial wefts across one part B1 of the width B of the substrate 2 and/or at least in sections preferably as full wefts across the entire width B of the substrate 2, wherein the weft threads 7 run parallel or diagonally to the courses 5a or also as transverse wefts diagonally to the courses 5a with direction changes. Although free ends 7a of the weft threads 7 are preferred owing to their higher wedge effect, cutting of the inversion points U of the weft threads can be dispensed with in particular if their linear density is in a range below 200 dtex.Z While the above description constitutes the preferred embodiment of the present invention, it will be appreciated that the invention is susceptible to modification, variation and change without departing from the proper scope and fair meaning of the accompanying claims.

The invention claimed is:

1. A self-windable, transversely tearable textile industrial adhesive tape consisting of:
   a tape-shaped substrate which has a thickness (D2) in the range of 0.2 mm to 1.5 mm, the tape-shaped substrate consisting of a fabric, the fabric having stitches made of yarn and weft threads running mutually parallel in a transverse direction (QR), the weft threads being held in the stitches of the fabric, and
   a pressure-sensitive adhesive coating on one side of the substrate and applied directly to the substrate, such that the adhesive tape has a thickness up to 2.5 mm and a weight that is less than 60 g/m²,
   wherein the weft threads have a linear density of 360 to 600 dtex,
   wherein the substrate has parallel lateral borders and the weft threads have free ends on the lateral borders,
   wherein the substrate is formed with closed or open stitches, the substrate comprising a basic warp knit construction of either a basic tricot pattern with a double-thread or multi-thread system, or a combination of a pillar stitch with one of a tricot pattern, a cloth pattern, a satin pattern, a velvet pattern, an atlas pattern, or a twill pattern, wherein the weft threads are texturized in such a way that the weft threads have a higher volume than smooth threads and then intermingled such that the weft threads have higher stability with cohesion not being achieved by twisting.

2. The adhesive tape according to claim 1, wherein the weft threads run at right angles to the warp direction in the warp knitted fabric.

3. The adhesive tape according to claim 1, wherein the fabric of the substrate is a stitch-bonded fabric.

4. The adhesive tape according to claim 1, wherein the fabric of the substrate has a gauge in the range of E9 to E 44 according to DIN ISO 8188:2009-02.

5. The adhesive tape according to claim 1, wherein the substrate has a specific weight per unit area of at least 20 g/m².

6. The adhesive tape according to claim 1, wherein the substrate has a tear strength in the longitudinal direction of at least 15 N/cm.

7. The adhesive tape according to claim 1, wherein at break in the longitudinal direction, the substrate has an elongation no greater that 60%.

8. The adhesive tape according to claim 1, wherein when the substrate is relieved before reaching a break under longitudinal stress, the substrate has an elongation that is reduced upon being relieved by less than 50%.

9. The adhesive tape according to claim 1, wherein the adhesive coating comprises at least one of a natural or synthetic rubber, a silicone, an acrylate-based adhesive, and a UV crosslinkable adhesive.

10. The adhesive tape according to claim 1, wherein the adhesive coating is applied onto the substrate with a basis weight at least 20 g/m².

11. The adhesive tape according claim 1, wherein the substrate has a stitch course count in the range of 2 per cm to 20 per cm.

12. The adhesive tape according to claim 1, wherein the substrate has a stitch wale count in the range of about 3 per cm to 15 per cm.

13. The adhesive tape according to claim 1, wherein the yarn of the stitches or the weft threads comprise at least one of polyester, polyamide (PA), polyethylene (PE), polypropylene (PP), polyacrylic (PAK), polyacrylonitrile (PAN), rayon, or cotton.

14. The adhesive tape according claim 1, wherein the yarn of the fabric has a linear density in the range of about 20 dtex to 167 dtex.

15. The adhesive tape according to claim 1, wherein the weft threads are made of at least one or a staple fiber yarn, a filament yarn, and a monofilament yarn.

16. The adhesive tape according to claim 1, wherein the weft threads are embedded in each course or wale of the fabric, wherein at least one of the stitches contains two or more of the weft threads.

17. The adhesive tape according to claim 16, wherein each of the stitches contains two or more of the weft threads.

18. The adhesive tape according to claim 1, wherein the weft threads have a thread count in the range of 5 to 100 threads per cm.

19. The adhesive tape according to claim 1, wherein the adhesive tape has an adhesive strength in the range of 2.0 N/cm to 15 N/cm on back of the tape.

20. The adhesive tape according to claim 1, wherein the substrate has an air permeability in the range of 50 l/m²s to 6000 l/m²s at a test pressure of 100 Pa when tested according to DIN 53 887.

21. The adhesive tape according to claim 1, wherein the adhesive tape has a noise reduction of at least Class C when tested according to LV 312.

22. The adhesive tape according to claim 1, wherein the adhesive tape has an abrasion resistance of at least Class C when tested according to LV 312.

23. The adhesive tape according to claim 1, wherein the adhesive tape has a tear strength in the range of 2000 mN to 30000 mN in an Elmendorf test in order to achieve tearability by hand.

24. The adhesive tape according to claim 1, wherein the fabric is free of runs.

25. The adhesive tape according to claim 1, wherein the weft threads extend in the fabric of the substrate at least in sections as partial wefts across one part (B1) of a width (B) of the substrate or at least in sections as full wefts across the entire width (B) of the substrate, wherein the weft threads run parallel or diagonally to courses or as transverse wefts diagonally to the courses with direction changes.

26. The adhesive tape according to claim 1, wherein the adhesive tape consists of the tape-shaped substrate and the pressure-sensitive adhesive coating, and the adhesive tape has been wound onto itself.

27. The adhesive tape according to claim 1, wherein the warp knitted fabric comprises a tricot lap.

28. The adhesive tape according to claim 1, wherein the warp knitted fabric comprises a pillar stitch, a satin lap, or a combination thereof.

29. A method of manufacturing an adhesive tape, the method consisting of the steps of:
providing a tape-shaped substrate consisting of a fabric, the fabric having stitches made of yarn and weft threads running mutually parallel in the transverse direction (QR), the weft threads being held in the stitches of the fabric for the manufacture of a self-windable, transversely tearable textile industrial adhesive tape, wherein the substrate has a thickness (D2) in the range of 0.2 mm to 1.5 mm, wherein the weft threads have a linear density of 360 to 600 dtex, wherein the substrate has parallel lateral borders, and the weft threads have free ends on the lateral borders, and the weft threads are texturized and then intermingled in such a way that the weft threads have a higher volume than smooth threads and stability with cohesion not being achieved by twisting, wherein the substrate is formed with closed or open stitches, the substrate comprising a basic warp knit construction of either a basic tricot pattern with a double-thread or multi-thread system, or a combination of a pillar stitch with one of a tricot pattern, a cloth pattern, a satin pattern, a velvet pattern, an atlas pattern, or a twill pattern; and
applying a pressure sensitive adhesive coating directly to the substrate, such that the adhesive tape has a thickness up to 2.5 mm and a weight that is less than 60 g/m².

30. The method of manufacturing adhesive tape according to claim 29, further comprising:
operating a substrate manufacturing means of a system consisting of, bars and knitting elements, which at least has an individual needle bar and a slider bar, a stitch sinker bar, a knock-over sinker bar with a knock-over sheet, one or two ground guide bars, one filler thread bar, which is configured as a guide or sinker and a weft insertion bar, or manufacturing by means of a system which at least comprises an individual needle bar and slider bar, one, two or three ground guide bars and a weft insertion bar, and manufacturing the substrate as a stitch-bonded fabric with open or closed stitches.

31. The method of manufacturing adhesive tape according to claim 29 further comprising:
manufacturing the substrate without rubber elastic or elastomeric threads or yarns, manufacturing the substrate without washing out of spinning oil, without thermosetting and without calendaring, wherein the adhesive tape consists of the tape-shaped substrate and the pressure sensitive adhesive coating, and
winding the adhesive tape onto itself.

32. The method of manufacturing adhesive tape according to claim 29 further comprising:
applying the pressure-sensitive adhesive coating to the substrate using a roller application method or using a nozzle application method, including one of direct coating, contact coating or pressure-less, indirect coating.

33. A self-windable, transversely tearable textile industrial adhesive tape consisting of:
a tape-shaped substrate which has a thickness (D2) in the range of 0.05 mm to 1.8 mm, the tape-shaped substrate consisting of a fabric, the fabric having stitches made of yarn and weft threads running mutually parallel in a transverse direction (QR), the weft threads being held in the stitches of the fabric, and
a pressure-sensitive adhesive coating on one side of the substrate and applied directly to the substrate with a specific weight per unit area in the range of 20 g/m² to 300 g/m², such that the resulting adhesive tape exhibits a tear strength that is in the range of 2,000 mN to 10,000 mN,
wherein the weft threads have a linear density of 360 to 600 dtex and a thread count on the order of 10 to 20 threads per cm,
wherein the substrate has parallel lateral borders and the weft threads have free ends on the lateral borders,
wherein the substrate is formed with closed or open stitches, the substrate comprising a basic warp knit construction of either a basic tricot pattern with a double-thread or multi-thread system, or a combination of a pillar stitch with one of a tricot pattern, a cloth pattern, a satin pattern, a velvet pattern, an atlas pattern, or a twill pattern,
wherein the weft threads are texturized in such a way that the weft threads have a higher volume than smooth threads and then intermingled such that the weft threads have higher stability with cohesion not being achieved by twisting.

34. A self-windable, transversely tearable textile industrial adhesive tape consisting of:
a tape-shaped substrate which has a thickness (D2) in the range of 0.2 mm to 1.5 mm, the tape-shaped substrate consisting of a fabric, the fabric having stitches made of yarn and weft threads running mutually parallel in a transverse direction (QR), the weft threads being held in the stitches of the fabric, and
a pressure-sensitive adhesive coating on one side of the substrate and applied directly to the substrate, such that the adhesive tape has a thickness up to 2.5 mm and a weight that is less than 60 g/m², wherein the resulting adhesive tape exhibits a tear strength that is in the range of 2,000 mN to 10,000 mN,
wherein the weft threads have a linear density of 360 to 600 dtex and a thread count on the order of 10 to 20 threads per cm,
wherein the substrate has parallel lateral borders and the weft threads have free ends on the lateral borders,
wherein the substrate is formed with closed or open stitches, the substrate comprising a basic warp knit construction of either a basic tricot pattern with a double-thread or multi-thread system, or a combination of a pillar stitch with one of a tricot pattern, a cloth pattern, a satin pattern, a velvet pattern, an atlas pattern, or a twill pattern,
wherein the weft threads are texturized in such a way that the weft threads have a higher volume than smooth threads and then intermingled such that the weft threads have higher stability with cohesion not being achieved by twisting.

* * * * *